Figure 3:
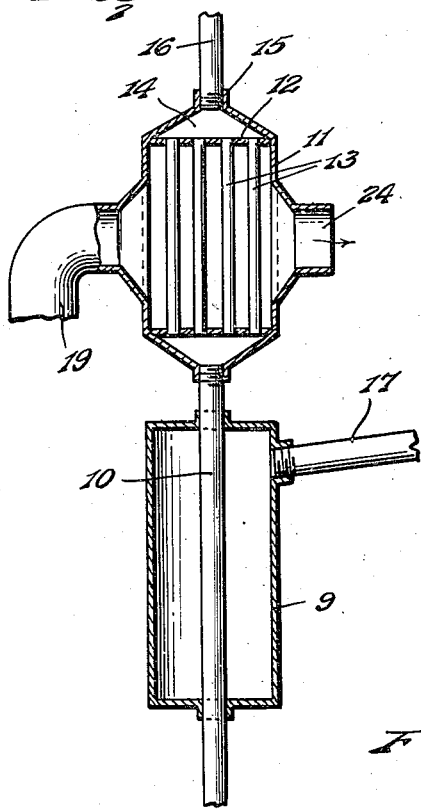

Dec. 2, 1941.     W. C. CLAY     2,264,297
MEANS FOR PREVENTING OR REMOVING ICE FORMATIONS
ON THE WINGS OF AIRPLANES
Filed March 18, 1939     2 Sheets-Sheet 1
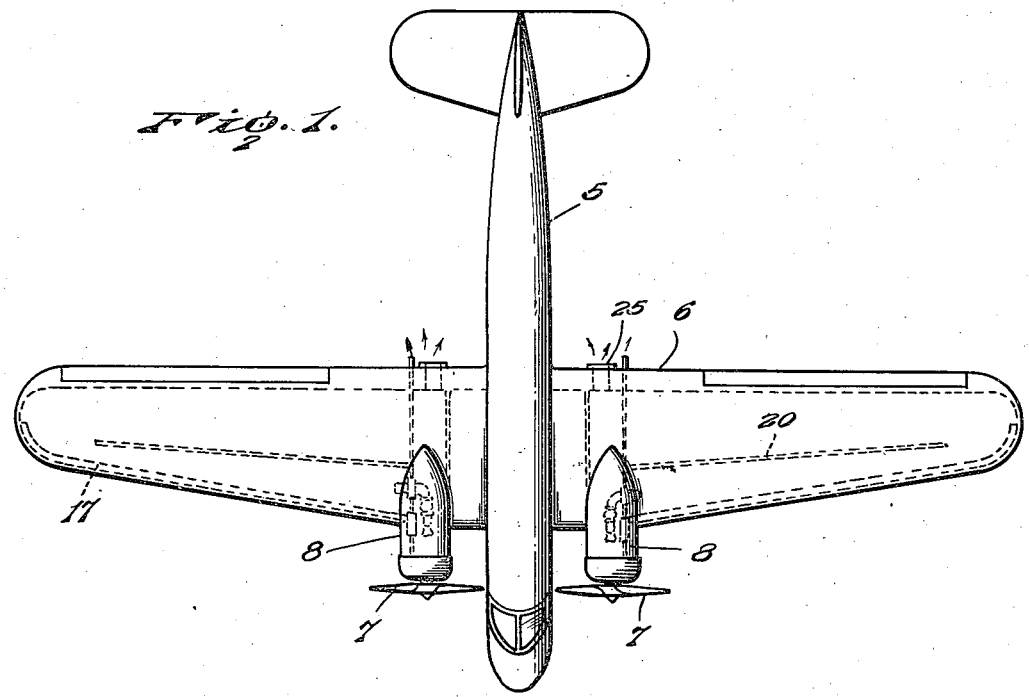
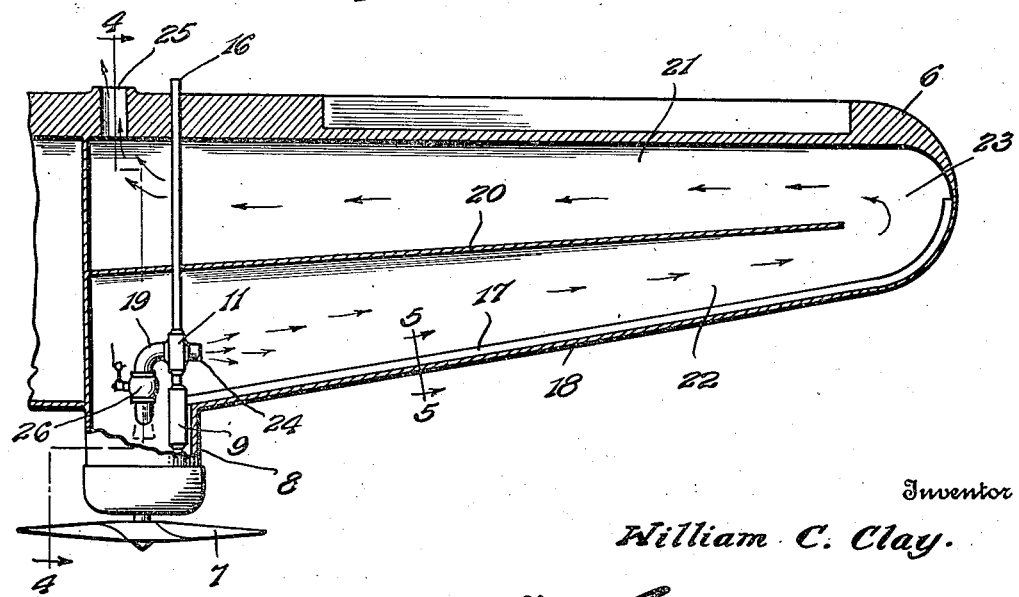
Inventor
William C. Clay.
By Lacey & Lacey,
Attorneys Dec. 2, 1941.  W. C. CLAY  2,264,297
MEANS FOR PREVENTING OR REMOVING ICE FORMATIONS
ON THE WINGS OF AIRPLANES
Filed March 18, 1939   2 Sheets-Sheet 2

Inventor
William C. Clay.
By Lacy & Lacy,
Attorneys

Patented Dec. 2, 1941

2,264,297

UNITED STATES PATENT OFFICE 2,264,297

MEANS FOR PREVENTING OR REMOVING ICE FORMATIONS ON THE WINGS OF AIRPLANES

William C. Clay, Buckroe Beach, Va.

Application March 18, 1939, Serial No. 262,698

6 Claims. (Cl. 244—134)

This invention relates to airplanes and more particularly to means for preventing or removing ice from the wings thereof.

Heretofore it has been proposed to prevent the formation of ice on the wings of aircraft by conducting hot air from the engine exhaust or other source of supply along the leading edge of the wings but such an arrangement has been found more or less unsatisfactory in actual practice owing to the fact that the specific heat of air is relatively low and that hot air does not provide a uniform distribution of heat along the leading edge and consequently fails to prevent or remove ice formations uniformly throughout the entire length of said leading edge. It has also been proposed to position a steam conductor along the leading edge of the wings to prevent ice formation thereon and while the use of steam insures a uniform distribution of heat along the leading edge, nevertheless, when either steam or hot air is used alone as a means for preventing or removing ice formations on the leading edge of the wings, the water or moisture incident to the de-icing operation tends to flow rearwardly over the upper surface of the wings and unless the temperature of the exposed wing surface back of the leading edge is maintained above the freezing point the water will collect and freeze back of said leading edge and not only increase the weight of the plane but also increase head resistance or drag with resulting dangerous hazard when flying under ice-forming conditions.

The object of the present invention, therefore, is to overcome these objectionable features by providing a de-icing system for aircraft in which steam or other vapor is employed for preventing or removing ice formations on the leading edge of the wings where uniform distribution of a large amount of heat at a relatively low temperature is essential, in combination with a supply of hot air, as contra-distinguished to exhaust gases, which hot air does not oxidize or impair the strength of all metal wings and is caused to circulate through said wings back of the leading edge to maintain the exposed surface thereof above the freezing point and thereby prevent reforming of ice on said exposed surface after liquification of the ice on the leading edge has been effected.

A further object of the invention is to provide a de-icing system, in which steam is generated and fresh air heated by the exhaust gases from the engine, means being provided for feeding the steam to a conductor at the leading edge of the wings and returning the water of condensation back to the generator and means for directing the hot air in a circuitous path through the wings at the rear of the leading edge to prevent the accumulation of ice thereon.

A further object is to provide a de-icing device, the steam generator, hot air heater and associated parts of which are housed within the engine nacelle, the latter being provided with an intake disposed in the air stream for delivering fresh air to the heater and circulating the heated air through the wings.

A further object is to provide a de-icing device, in which the hot air instead of discharging at the trailing edge of the wings may be conducted back to the heater so as to form, in effect, a closed air circulating system.

A still further object of the invention is to provide a de-icing system which is simple in construction and effective in operation and which can be readily installed on any standard make of aircraft without necessitating any material structural changes therein.

In the accompanying drawings forming a part of this specification and in which similar numerals of reference indicate corresponding parts in all the figures of the drawings:

Figure 1 is a top plan view of an airplane provided with my improved de-icing system.

Figure 4:
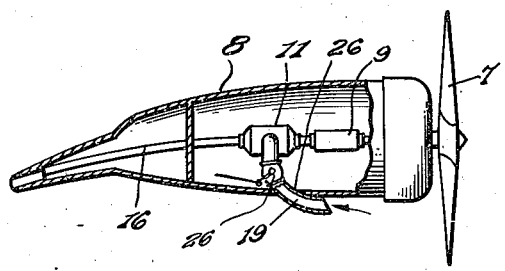
Figure 5:
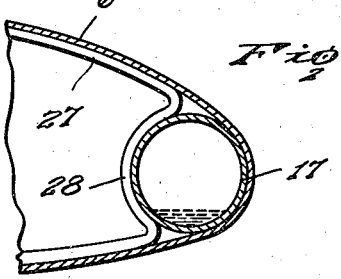
Figure 6:
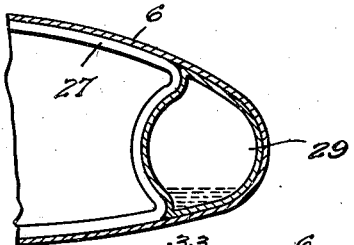
Figure 7:
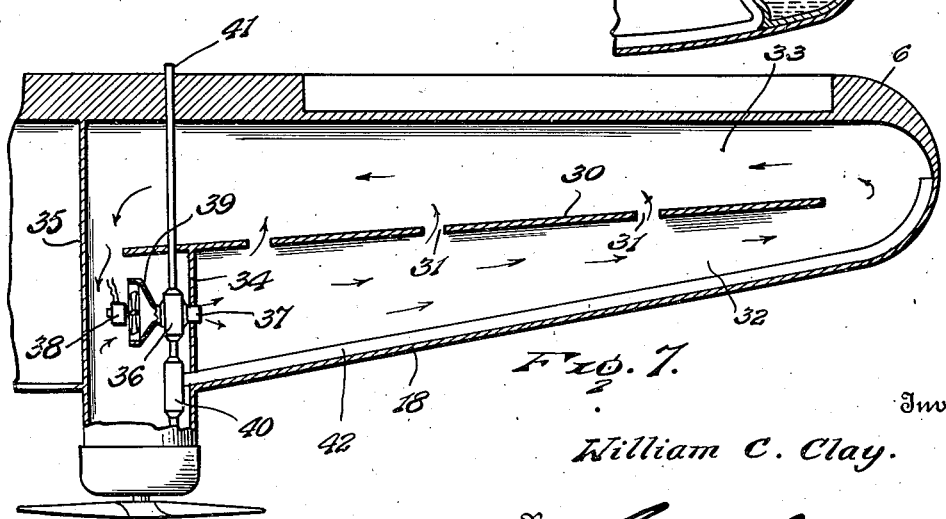

Figure 2 is a longitudinal sectional view of one of the wings and its associated parts, the transverse ribs or braces being omitted for the sake of clearness, Figure 3 is a longitudinal sectional view of the steam and hot air heating plant, Figure 4 is a transverse sectional view taken on the line 4—4 of Figure 2, certain of the parts being shown in elevation, Figure 5 is an enlarged transverse sectional view taken on the line 5—5 of Figure 2, Figure 6 is a similar view illustrating a slightly different construction of vapor conductor, and Figure 7 is a longitudinal sectional view illustrating a modified form of the invention.

The improved wing de-icing system forming the subject-matter of the present invention may be used in connection with any kind of aircraft, and by way of illustration is shown applied to a twin-motored monoplane, in which 5 designates the fuselage, 6 the wings and 7 the propellers driven by an engine mounted in the motor nacelle 8, the engine being omitted for the sake of clearness. The system comprises a heating plant including a steam boiler 9 mounted within the nacelle 8 and surrounding and heated by the exhaust pipe 10 from the engine. Associated with the steam generator or boiler 9 is a hot air heater 11 consisting of spaced header plates 12 connected by a plurality of longitudinal tubes 13. The opposite ends of the heater are tapered and spaced from the plates 12 to form terminal chambers 14 provided with threaded nipples 15, one of which has threaded connection with the adjacent end of the exhaust pipe 10 while the other engages the threads on a pipe 16 discharging at the trailing edge of the wing, as shown. Communicating with the interior of the boiler 9 is a pipe or conductor 17 which extends along the leading edge 18 of the wing in intimate contact therewith for the entire length thereof for the purpose of supplying steam to the leading edge of the wing to prevent the formation or removal of ice thereon when flying under ice-forming conditions. The free end of the conductor 17 is closed and preferably conforms to and extends around the tip of the wing for the major portion of the width of said tip, as best shown in Figure 2 of the drawings. The conductor 17 not only serves to heat the leading edge of the wing and prevent the formation of ice thereon but also serves to reinforce and strengthen said wing. Connected with one side of the heater 11 is a pipe or conduit 19 which extends through the bottom of the motor nacelle 8 with the end thereof disposed in the path of the air stream so that, when the airplane is in motion, air will be fed through the conduit 19 into the heater 11 and around the tubes 13 for heating said air prior to delivery into the interior of the wing.

Disposed within the wing 6 and extending longitudinally thereof is a plate or partition 20 defining independent compartments 21 and 22 adapted to receive heated air from a nipple 24 on the heater 11. The outer end of the partition 20 is spaced from the tip of the wing to form a passage 23 communicating with the compartments 21 and 22 so as to permit the free circulation of hot air through the wing for the purpose of maintaining the exposed surface of the wing at the rear of the leading edge above freezing temperature and thus prevent the reforming of ice on said exposed surface after liquification of the ice on the leading edge has been effected. An opening 25 is formed in the trailing edge of the wing and communicates with the compartment 21 to permit the discharge of the hot air at the rear of the airplane after it has served its purpose.

Inasmuch as the outer end of the conductor 17 is closed and said conductor is inclined slightly in the direction of the nacelle, the water of condensation will flow back into the boiler 9 where it is again converted into steam.

In operation, steam from the boiler 9 is conducted through the pipe 17 along the leading edge of the wing to heat the skin of the wing and prevent or remove ice formations thereon, the water of condensation flowing back into the boiler, as previously stated. As the plane travels in a forward direction, the air in the air stream will enter the conduit 19 and circulate around the tubes 13 so as to heat the air to the required temperature, the heated air being discharged into the forward compartment 22 of the wing through the nipple 24 and directed in a circuitous path through the wing and out through the discharge opening 25. If desired, a valve 26 may be disposed in the conduit 19 for the purpose of cutting off the supply of the fresh air to the heater when the de-icer is not in use. The vapor conductor 17 is preferably retained in position adjacent the leading edge of the wing by forming the ribs or braces 27 of the wing with curved seats 28 adapted to receive the conductor, as best shown in Figure 5 of the drawings.

In Figure 6 of the drawings, there is illustrated a modified form of the invention, in which the vapor conductor 29 is of a slightly different shape so as to provide a greater area for contact with the skin of the wing at the leading edge thereof.

In Figure 7 of the drawings, there is illustrated a further modification of the invention in which a closed hot air circulating system is provided for the interior of the wing. In this form of the device, the longitudinal partition 30 is preferably provided with spaced openings 31 forming a source of communication between the front and rear compartments 32 and 33. A transverse partition or barrier 34 extends between the leading edge of the wing and the partition 30 so as to cut off communication between the front compartment 32 and the interior of the motor nacelle 35. The heater 36 is provided with a discharge nipple 37 extending through the partition 34 so that the heated air from the heater 36 will enter the forward compartment 32 and thence pass through the openings 31 and around the end of the partition 30 into the rear compartment 33 and thence back into the motor nacelle so as to form, in effect, a closed air circulating system. In this form of the device instead of admitting air to the heater through a conduit extending in the air stream, there is provided an electric fan 38 which discharges against a conical-shaped intake member 39 communicating with the interior of the heater, as best shown in Figure 6 of the drawings. A steam generator 40 heated by the gases in the exhaust pipe 41 is also employed and a steam or vapor conductor 42 communicates with the steam generator and extends along the leading edge similar to the conductor shown in Figure 2 of the drawings.

It is not feasible or practical to use steam for the entire wing because sufficient heat is not available from the engine exhaust to steam heat the entire wing and if a sufficient quantity of heat were available the arrangement would not be efficient because more heat would be supplied to the rear of the wing than is necessary for the purpose. A steam heating system must necessarily be closed and steam-tight in order to be effective and any structure used for steam heating the entire wing would necessarily be heavy and cumbersome and consequently materially add to the weight of the airplane. Furthermore, hot air is also impractical for heating the entire wing because the specific heat of air is so low that excessively high air temperatures would be required at the leading edge in order to supply the necessary quantity of heat for de-icing. Even if excessively high temperatures were reasonably available, the system could not be used to advantage because the strength of the metal used in the interior construction of airplanes is seriously reduced at temperatures above two hundred degrees Fahrenheit. The present invention provides a combined system in which steam or other vapor is used for heating the leading edge of the wing and hot air circulating in a circuitous path within the rear portion of the wing is employed for maintaining the exposed surface of the wing at the rear of the leading edge thereof above freezing temperature to prevent the reforming of ice on said exposed surface after liquification of the ice on said leading edge has been effected. Such a system is both practical and economical in operation and as the units comprising the system are few and simple in construction the device can be installed and operated at a minimum expense.

Having thus described the invention, what is claimed as new is:

1. In an airplane, the combination with a wing and motor, of a chamber disposed at the inner end of the wing, a longitudinal partition arranged within the wing and defining front and rear communicating compartments, a barrier cutting off communication between the chamber and one of said compartments, the other compartment being in communication with the chamber, an imperforate conductor disposed within and extending along the leading edge of the wing for heating the same, means for supplying heat to the conductor, a hot air heater disposed within the chamber and provided with a portion extending through the barrier for discharging hot air directly into the adjacent compartment, and means for supplying fresh air to the heater.

2. In an airplane, the combination with a wing, motor and motor nacelle, of a longitudinal partition disposed within the wing and defining front and rear communicating compartments, a steam generator housed within the motor nacelle and heated by the exhaust from the motor, an imperforate steam conductor arranged within and extending along the leading edge of the wing, said conductor having its outer end closed and conforming to the shape of the tip of the wing and its inner end communicating with the steam generator, a barrier cutting off communication between the motor nacelle and the front compartment of the wing, the rear compartment being in communication with the interior of the motor nacelle, an air heater discharging through the barrier into the forward compartment and heated by the exhaust from the engine, and means for supplying fresh air to the heater whereby the heated air will travel in a circuitous path around the partition and back to the source of air supply.

3. In an airplane, the combination with a wing, motor and motor nacelle, of a partition extending longitudinally within the wing and defining front and rear compartments, said partition terminating short of the tip of the wing and having spaced openings in the length thereof forming a source of communication between both compartments, an imperforate heat conductor disposed within and extending longitudinally of the leading edge of the wing for substantially the entire length thereof, means for supplying heat to said conductor, a barrier cutting off communication between the front compartment and the interior of the motor nacelle, an air heater arranged within the motor nacelle and including a casing having a discharge end extending through the barrier for directing heated air from said heater within the adjacent compartment, and means for supplying fresh air to the heater and causing the heated air to flow in a circuitous path through the front compartment and passage into the rear compartment and thence back to the air supply.

4. In an airplane, the combination with the wings, motor and motor nacelle, of a combined vapor and hot air de-icing device comprising a steam generator housed within the nacelle and heated by the exhaust gas from the motor, an imperforate conductor disposed within each wing at the leading edge thereof and communicating with the generator for supplying a quantity of confined hot vapor to said leading edge, an air heater also heated by the motor exhaust and including a casing, an exhaust pipe connected with the heater casing and discharging at the rear of the adjacent wing, an air intake opening through the nacelle in the path of the air stream and connected with the casing of the air heater, baffles disposed longitudinally within the wings and spaced from the outer end thereof to form a passage, and means for delivering heated fresh air from said heater in an unconfined state on one side of the baffles and circulating the heated air in a path substantially parallel to the adjacent vapor conductor and in contact therewith and thence through said passage and rearwardly of the wing substantially parallel with the trailing edge thereof for maintaining the major portion of the surfaces of the wings above the freezing point.

5. In an airplane, the combination with the wings, motor and motor nacelle, of a combined vapor and hot air de-icing device comprising an imperforate vapor conductor arranged within and along the leading edge of the wings, means disposed within the motor nacelle for supplying vapor to said conductor, a partition extending longitudinally within the interior of the wings and defining front and rear communicating compartments, one of which opens to the atmosphere at the trailing edge of the adjacent wing, an air heater heated by the motor exhaust and including a casing discharging into the other compartment near the inner end of the wing for circulating heated fresh air in a path substantially parallel to the vapor conductor and in contact therewith to assist in preventing rapid condensation of the vapor and keep the temperature of the exposed surfaces of the rear portions of the wings above the freezing point, an exhaust pipe connected with the heater casing and discharging at the trailing edge of the wing in spaced relation to the discharge opening of the rear compartment, and an air conduit extending through the motor nacelle and having one end thereof disposed in the air stream and the other end communicating with the air heater.

6. In an airplane, the combination with the wings and motor, of a combined vapor and hot air de-icing device comprising a vapor generator, an imperforate conductor disposed within each wing at the leading edge thereof and communicating with the generator for supplying a quantity of confined hot vapor to said leading edge, an air heater including a casing, an air intake communicating with said casing, baffles disposed longitudinally within the wings and having end portions permitting communication between the front and rear portions of said wings, and means for delivering heated air from said heater in an unconfined state on one side of the baffles and circulating the heated air in a path substantially parallel to the adjacent vapor conductor and across the end portions of the wings and rearwardly thereof substantially parallel with the trailing edge of the wings for maintaining the major portion of the surfaces of the wings above the freezing point.

WILLIAM C. CLAY.